United States Patent
Liu et al.

(10) Patent No.: US 11,363,552 B2
(45) Date of Patent: Jun. 14, 2022

(54) METHOD OF SYNCHRONIZED SIGNAL BLOCK MEASUREMENT, USER EQUIPMENT AND NETWORK DEVICE

(71) Applicant: VIVO MOBILE COMMUNICATION CO., LTD., Chang'an Dongguan (CN)

(72) Inventors: Siqi Liu, Chang'an Dongguan (CN); Yu Ding, Chang'an Dongguan (CN); Zichao Ji, Chang'an Dongguan (CN); Xueming Pan, Chang'an Dongguan (CN); Qian Zheng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 89 days.

(21) Appl. No.: 16/645,359

(22) PCT Filed: Aug. 31, 2018

(86) PCT No.: PCT/CN2018/103567
§ 371 (c)(1),
(2) Date: Mar. 6, 2020

(87) PCT Pub. No.: WO2019/047783
PCT Pub. Date: Mar. 14, 2019

(65) Prior Publication Data
US 2020/0236636 A1    Jul. 23, 2020

(30) Foreign Application Priority Data

Sep. 8, 2017    (CN) .......................... 201710806842.X

(51) Int. Cl.
*H04W 56/00*    (2009.01)
*H04W 76/27*    (2018.01)
(Continued)

(52) U.S. Cl.
CPC ......... *H04W 56/001* (2013.01); *H04L 1/1642* (2013.01); *H04W 24/10* (2013.01); *H04W 72/0446* (2013.01); *H04W 76/27* (2018.02)

(58) Field of Classification Search
CPC ... H04W 56/001; H04W 76/27; H04W 24/10; H04W 72/0446; H04L 1/1642
See application file for complete search history.

(56) References Cited

U.S. PATENT DOCUMENTS

| | | | |
|---|---|---|---|
| 2017/0251460 A1 | 8/2017 | Agiwal et al. | |
| 2017/0331670 A1* | 11/2017 | Parkvall | H04L 41/0233 |
| 2018/0262313 A1* | 9/2018 | Nam | H04L 5/0044 |

FOREIGN PATENT DOCUMENTS

CN    106793058 A    5/2017

OTHER PUBLICATIONS

European Search Report Application No. 18853333.5; dated Aug. 21, 2020.
(Continued)

*Primary Examiner* — Mohammad S Anwar
(74) *Attorney, Agent, or Firm* — von Briesen & Roper, s.c.

(57) ABSTRACT

The present disclosure discloses a method of synchronized signal block measurement, a user equipment and a network device. The method includes: receiving auxiliary measurement information, which is transmitted by a network device and is used to assist the UE to perform synchronized signal block measurement; and, determining repetitive synchronized signal blocks according to the auxiliary measurement information. The auxiliary measurement information is used to indicate transmission configuration information of synchronized signal blocks.

20 Claims, 4 Drawing Sheets receiving auxiliary measurement information, which is transmitted by a network device and is used to assist the UE to perform synchronized signal block measurement — 21 determining synchronized signal blocks repetition according to the auxiliary measurement information and performing measurement — 22

(51) Int. Cl.
*H04L 1/16* (2006.01)
*H04W 24/10* (2009.01)
*H04W 72/04* (2009.01)

(56) References Cited

OTHER PUBLICATIONS

Nokia et al.; On SS Burst Set composition; 3GPP TSG-RAN WG1#90; R1-1714005; Prague, Czech Republic, Aug. 21, 2017-Aug. 25, 2017.

InterDigital Inc.; On SS Block and Burst Set Design and Indication; 3GPP TSG RAN WG1 Meeting #90; R1-1714129; Prague, Czech Republic, Aug. 21, 2017-Aug. 25, 2017.

Nokia et al.; Summary of AI 6.1.2.3.7 QCL; 3GPP TSG RAN WG1 #90; R1-1715074; Prague, Czech Republic, Aug. 21, 2017-Aug. 25, 2017.

Zte et al.; WF on SS block QCL Indication; 3GPP TSG RAN WG1 Meeting #90; R1-1715212; Prague, Czechia, Aug. 21, 2017-Aug. 25, 2017.

VIVO; SS block and CSI-RS based measurement configuration in RRC_CONNECTED state; 3GPP TSG-RAN WG2 Meeting #99; R2-1708420; Berlin, Germany, Aug. 21, 2017-Aug. 25, 2017.

International Search Report & Written Opinion related to Application No. PCT/CN2018/103567; dated Nov. 22, 2018.

Huawei et al; "Discussion and evaluation on NR-SS periodicity", 3GPP TSG RAN WG1 Meeting #88, R1-1701721, Athens, Greece, Feb. 13, 2017-Feb. 17, 2017.

Samsung; "SS Periodicity", 3GPP TSG RAN WG1#88, R1-1702903, Athens, Greece, Feb. 13, 2017-Feb. 17, 2017.

VIVO; "SS block transmissions and RRM measurement in wideband CC", 3GPP TSG RAN WG1 NR Ad-Hoc Meeting #2, R1-1710374, Qingdao, P.R. China, Jun. 27, 2017-Jun. 30, 2017.

InterDigital Inc.; "On SS Block Based Timing Indication in NR", 3GPP TSG RAN WG1 NR AH#2, R1-1710915, Qingdao. P.R. China, Jun. 27, 2017-Jun. 30, 2017.

VIVO; "Remaining issues on SS block and SS burst set composition", 3GPP TSG RAN WG1 NR Ad-Hoc#3, R1-1715606, Nagoya, Japan, Sep. 18, 2017-Sep. 21, 2017.

* cited by examiner

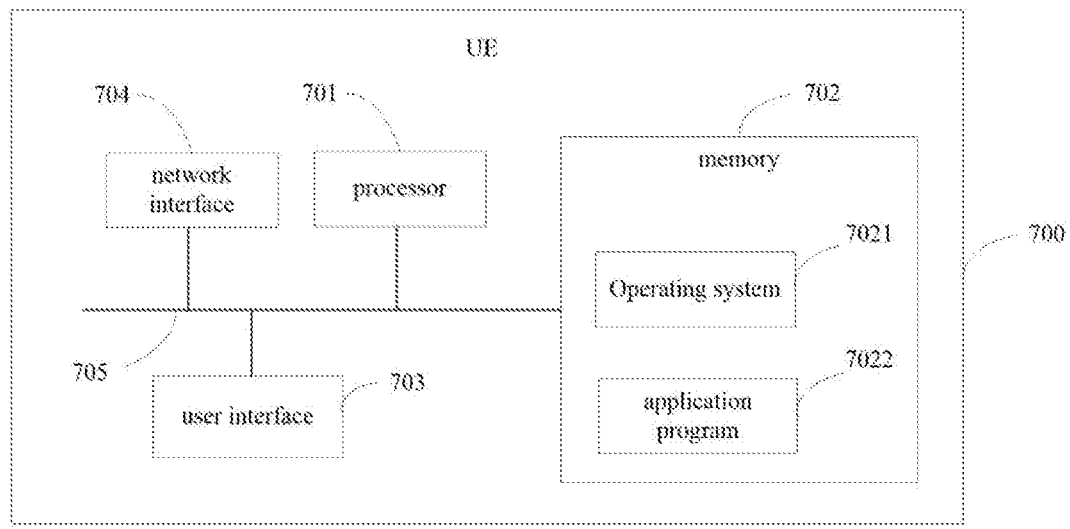
FIG. 7
transmitting to UE, auxiliary measurement information which is used to assist the UE to perform synchronized signal block measurement — 81
FIG. 8
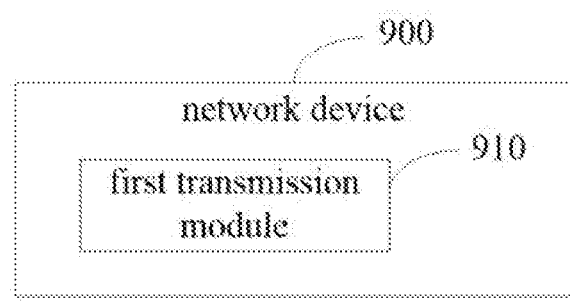
FIG. 9

METHOD OF SYNCHRONIZED SIGNAL BLOCK MEASUREMENT, USER EQUIPMENT AND NETWORK DEVICE

CROSS-REFERENCE TO RELATED APPLICATION

This application is the U.S. national phase of PCT Application PCT/CN2018/103567 filed on Aug. 31, 2018, which claims the benefit and priority of Chinese Application No 201710806842.X, filed on Sep. 8, 2017, which is incorporated herein by reference in its entirety.

TECHNICAL FIELD

The present disclosure relates to the field of communication technologies, and in particular to a method of synchronized signal block measurement, a user equipment and a network device.

BACKGROUND

In the future 5th Generation (5G) communication system or New Radio (NR) system, network devices need to transmit Synchronized Signal and PBCH Block (SS block) for user equipment (UE) to perform synchronization, system information acquisition or measurement evaluation. The SS block is composed of a New Radio Synchronized Signal (NR-SS) and a New Radio Physical Broadcast Channel (NR-PBCH) signal. The NR-SS includes a New Radio Primary Synchronized Signal (NR-PSS) and a New Radio Secondary Synchronized Signal (NR-SSS). Generation of NR-SS sequence is related to Physical Cell Identifier (PCI), and the NR-PBCH signal is mainly used to acquire System Information Block (MIB).

Multiple SS blocks together form a Synchronized Signal burst set (SS burst set). The maximum number of SS blocks included in one SS burst set is related to carrier frequencies used by the system. For example, when the carrier frequency is less than 3 GHz, one SS burst set may include up to 4 SS blocks; when the carrier frequency is in a range of from 3 GHz to 6 GHz, one SS burst set may include up to 8 SS blocks; when the carrier frequency is in a range of from 6 GHz to 52.6 GHz, one SS burst set may include up to 64 SS blocks. The period of the NR-PBCH signal is 80 ms. Multiple SS burst sets are repetitively transmitted during one NR-PBCH period. That is, among the repetitive SS burst sets during one NR-PBCH period, contents of SS blocks with the same index are consistent, which enables the UE to support soft combining, thereby achieving coverage enhancement. However, contents of NR-PBCH signals between different Transmission Time Intervals (TTIs) may be varied.

When the frequency is less than 3 GHz, one SS burst set includes 4 SS blocks. In the relationship of NR-PBCH period, SS blocks and SS burst sets as shown in FIG. 1, the TTI period of the NR-PBCH signal is 80 ms, and the period of the SS burst set may be configured as {5, 10, 20, 40, 80, 160}ms. It is assumed that the period of each SS burst set is 20 ms, and there are 4 SS burst sets in the TTI period of the NR-PBCH signal. No matter how long the period of the SS burst set is set to, all SS blocks in one SS burst set are required to be transmitted within a 5 ms time window. In case that no network pre-configured information is received, when the UE performs initial cell selection, the UE searches for SS blocks according to the default period of the SS burst set, i.e., 20 ms.

In order to avoid influence of short-term fluctuations such as fast fading of signals, the UE needs to perform multiple measurement sampling on SS blocks in time and frequency domains within a set measurement period, and calculate an average value of a series of uniformly distributed measurement samples in the measurement period. The average value can be taken as a reference for cell selection/handover/reselection and other processes. The measurement period is determined by performance requirements of the relevant wireless scenario, and may reach several hundred milliseconds. For example, a measurement period of reference signal receiving power (RSRP) in the Long Term Evolution (LTE) communication system may be 200 ms. In case that the UE searches for SS blocks according to the default period of 20 ms, during the measurement period, the UE needs to perform multiple times of sampling signals for 20 ms, to search for the SS block. This has higher requirements on processing capabilities of the UE (such as cache and processing speed of the UE) and consumes more power. Further, as frequency bands of New Radio (NR) increase, SS blocks may be simultaneously transmitted at multiple positions in the frequency domain, the UE supporting large bandwidth needs to perform blind detection, measurement and information reading for SS blocks at these positions in the frequency domain. This further increases complexity of blind detection of the UE, and increases blind detection time and power consumption.

SUMMARY

In a first aspect, one embodiment of the present disclosure provides a method of synchronized signal block measurement, applied to a user equipment (UE), including:

receiving auxiliary measurement information, which is transmitted by a network device and is used to assist the UE to perform synchronized signal block measurement; wherein the auxiliary measurement information is used to indicate transmission configuration information of synchronized signal blocks; and determining repetitive synchronized signal blocks according to the auxiliary measurement information.

In a second aspect, one embodiment of the present disclosure provides a user equipment (UE), including:

a first receiving module used to receive auxiliary measurement information, which is transmitted by a network device and is used to assist the UE to perform synchronized signal block measurement; wherein the auxiliary measurement information is used to indicate transmission configuration information of synchronized signal blocks; and a determining module used to determine repetitive synchronized signal blocks according to the auxiliary measurement information.

In a third aspect, one embodiment of the present disclosure provides a user equipment (UE) including: a processor, a memory, and a computer program stored on the memory and executable on the processor; wherein the computer program is executed by the processor to implement steps of the above method.

In a fourth aspect, one embodiment of the present disclosure provides a method of synchronized signal block measurement, applied to a network device, including:

transmitting to a user equipment (UE), auxiliary measurement information which is used to assist the UE to perform synchronized signal block measurement; wherein the auxiliary measurement information is used to indicate transmission configuration information of synchronized signal blocks.

In a fifth aspect, one embodiment of the present disclosure provides a network device including:

a first transmission module used to transmit to a user equipment (UE), auxiliary measurement information which is used to assist the UE to perform synchronized signal block measurement, wherein the auxiliary measurement information is used to indicate transmission configuration information of synchronized signal blocks.

In a sixth aspect, one embodiment of the present disclosure provides a network device including: a processor, a memory, and a computer program stored on the memory and executable on the processor; wherein the computer program is executed by the processor to implement steps of the above method.

In a seventh aspect, one embodiment of the present disclosure provides a computer readable storage medium including a computer program stored thereon; wherein the computer program is executed by a processor to implement steps of the above method.

BRIEF DESCRIPTION OF THE DRAWINGS

FIG. 7 is a block diagram of a user equipment according to an embodiment of the present disclosure:

FIG. 8 is a flowchart of a method of synchronized signal block measurement at a network device according to an embodiment of the present disclosure;

FIG. 9 is a schematic diagram of a network device according to an embodiment of the present disclosure.

DETAILED DESCRIPTION

Exemplary embodiments of the present disclosure will be described hereinafter in details with reference to the accompanying drawings. Although exemplary embodiments of the present disclosure are shown in the accompanying drawings, it should be understood that the present disclosure may be implemented in various forms and should not be limited by the embodiments described herein. On the contrary, these embodiments are provided to enable a thorough understanding of the present disclosure, and to fully convey the scope of the present disclosure to those skilled in the art.

Terms such as "first" and "second" in the specification and claims of the present application are used merely to distinguish similar objects and are not necessarily used to describe a particular order or sequence. It is to be understood that data so used may be interchanged where appropriate, such that the embodiments of the present application described herein may be implemented, for example, in a sequence other than those illustrated or described herein. Furthermore, the terms "comprise", "include" or any other variations are intended to encompass a non-exclusive inclusion, such that a process, method, system, commodity, or device that include a series of steps or elements include not only those steps or elements but also other steps or elements that are not explicitly listed, or steps or elements that are inherent to such process, method, commodity, or device.

Figure 1:
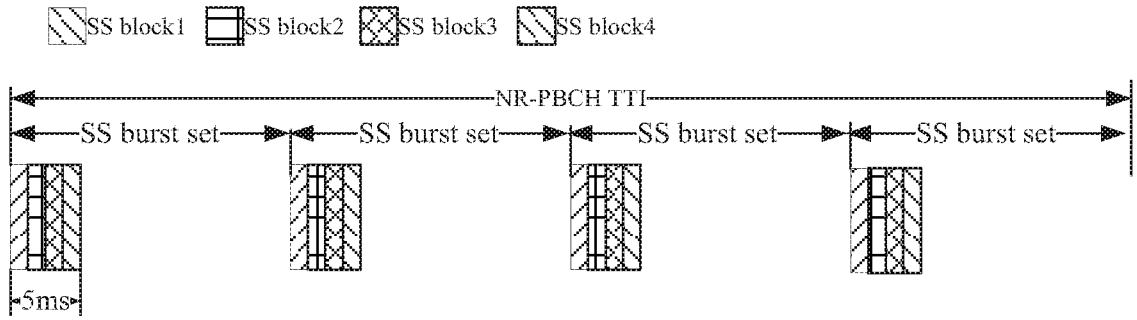
FIG. 1 is a diagram showing relationship between NR-PBCH period, SS blocks and SS burst sets.
Figure 2:
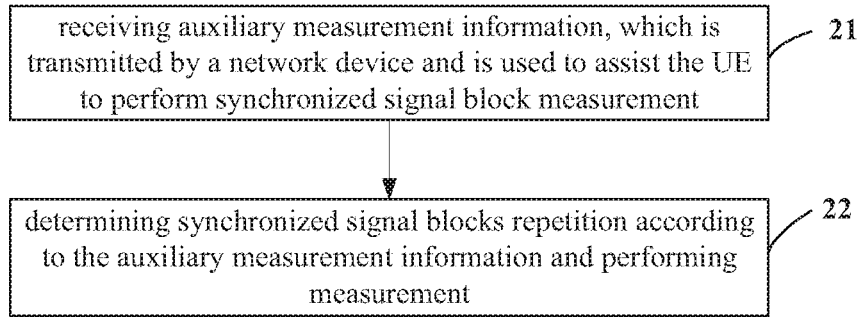
FIG. 2 is a flowchart of a method of synchronized signal block measurement at a user equipment according to an embodiment of the present disclosure.

As shown in FIG. 2, an embodiment of the present disclosure provides a method of synchronized signal block measurement, which is applied to a user equipment, including the following steps.

Step 21: receiving auxiliary measurement information, which is transmitted by a network device and is used to assist the UE to perform synchronized signal block measurement.

The auxiliary measurement information is used to indicate transmission configuration information of synchronized signal blocks.

The network device may repetitively transmit the synchronized signal blocks by the same beam at multiple transmission positions of one or more domains in the time domain and the frequency domain. The synchronized signal block includes a physical broadcast channel, a primary synchronized signal and a secondary synchronized signal. The physical broadcast channel carries system information, such as a system master information block (MIB). Except transmitting synchronized signal blocks to the UE, the network device further transmits to the UE the auxiliary measurement information which indicates the transmission configuration information of these synchronized signal blocks.

Specifically, the network device may transmit the auxiliary measurement information through system information or radio resource control (RRC) layer signaling; accordingly, the UE receives through the system information or the RRC layer signaling, the auxiliary measurement information which is transmitted by the network device and is used to assist the UE to perform synchronized signal block measurement. The system information includes at least one of system Master Information Block (MIB), Remaining Minimum System Information (RMSI) and other System Information (OSI).

Step 22: according to the auxiliary measurement information, determining repetitive synchronized signal blocks and performing measurement.

After receiving the auxiliary measurement information, according to the transmission configuration information of the synchronized signal blocks indicated by the auxiliary measurement information, the UE may obtain transmission configuration of the synchronized signal blocks, such as which synchronized signal blocks are repetitive, the number of repetition times of repetitive synchronized signal block. Then, when the synchronized signal block is measured or decoded, the synchronized signal block can be quickly blindly detected, thereby reducing blind detection time, blind detection difficulty and measurement time, improving measurement accuracy, accelerating cell access/reselection/handover, and achieving energy saving in the UE.

Specifically, the above auxiliary measurement information includes at least one of the following information: first indication information used to indicate pattern of synchronized signal blocks repetition in time-domain transmission resources; second indication information used to indicate pattern of synchronized signal blocks repetition in frequency-domain transmission resources; and third indication information used to indicate Quasi Co-Location (QCL)

information of the synchronized signal blocks. That is, the network device transmits to the UE the auxiliary measurement information carrying at least one of the first indication information, the second indication information and the third indication information. After the UE receives the auxiliary measurement information, if the UE obtains the first indication information by parsing the auxiliary measurement information, the UE determines a first pattern of synchronized signal blocks repetition in the time-domain transmission resources. If the UE obtains the second indication information by parsing the auxiliary measurement information, the UE determines a second pattern of synchronized signal blocks repetition in the frequency-domain transmission resources. If the UE obtains the third indication information by parsing the auxiliary measurement information, the UE determines quasi-co-location information of the synchronized signal blocks. The UE further determines synchronized signal blocks repetition and performs measurement, according to at least one of the first indication information, the second indication information and the third indication information.

Further, the first indication information is used to indicate a pattern of synchronized signal blocks repetition in the time domain at the current frequency domain position. This pattern needs to indicate information of the synchronized signal blocks repetition in the time domain, such as, at which time-domain locations there are synchronized signal blocks repetition in the time domain, and the number of repetition times of synchronized signal blocks repetition in the time domain at these time-domain locations. Specifically, the pattern indicated by the first indication information includes at least one of the following information: position information of candidate time-domain transmission resources for synchronized signal blocks repetition, position information of time-domain transmission resources actually used for synchronized signal blocks repetition, information of allowed repetition times of synchronized signal blocks in time-domain transmission resources, and information of actual repetition times of synchronized signal blocks in time-domain transmission resources.

Similarly, the second indication information is used to indicate a pattern of synchronized signal blocks repetition in the frequency domain. This pattern needs to indicate information of the synchronized signal blocks repetition in the frequency domain, such as, at which frequency-domain locations there are synchronized signal blocks repetition in the frequency domain, numerology information of these frequency-domain locations such as subcarrier spacing and Cyclic Prefix (CP), and the number of repetition times of synchronized signal blocks in the frequency domain at these frequency-domain locations. Specifically, the pattern indicated by the second indication information includes at least one of the following information: position information of candidate frequency-domain transmission resources for synchronized signal blocks repetition, position information of frequency-domain transmission resources actually used for synchronized signal blocks repetition, information of allowed repetition times of synchronized signal blocks in frequency-domain transmission resources, information of actual repetition times of synchronized signal blocks in frequency-domain transmission resources, numerology information of candidate frequency-domain transmission resources allowed for synchronized signal blocks repetition, and numerology information of frequency-domain transmission resources actually used for synchronized signal blocks repetition. The numerology information of candidate frequency-domain transmission resources allowed for synchronized signal blocks repetition, includes at least one of a subcarrier spacing of candidate frequency-domain transmission resources allowed for synchronized signal blocks repetition and a cyclic prefix of candidate frequency-domain transmission resources allowed for synchronized signal blocks repetition. The numerology information of frequency-domain transmission resources actually used for synchronized signal blocks repetition, includes at least one of a subcarrier spacing of frequency-domain transmission resources actually used for synchronized signal blocks repetition and a cyclic prefix of frequency-domain transmission resources actually used for synchronized signal blocks repetition.

It should be noted that both of the first indication information and the second indication information refer to the patterns of synchronized signal blocks repetition, and the pattern may be a default pattern, a predefined pattern, and a pattern directly configured by the network device. Different network devices may configure different default patterns and the network device notifies the UE of the default pattern when the UE is initially connected; or, different network devices may configure the same default pattern, and then the network device does not need to notify the UE of the default pattern. When there are multiple different predefined patterns in the system or the network device directly configures the pattern, the network device may notify the UE of the predefined pattern and the configured pattern by the auxiliary measurement information.

Specifically, when the auxiliary measurement information includes the first indication information and the second indication information, the first indication information and the second indication information may be separately indicated, and the first indication information and the second indication information may also be jointly indicated. The above two indication modes will be further described in details hereinafter with reference to specific examples.

First manner: the first indication information and the second indication information are jointly indicated.

The first indication information and the second indication information form a joint index information. The joint index information is used to indicate a pattern of synchronized signal blocks repetition in time-domain transmission resources and frequency-domain transmission resources. That is to say, patterns of synchronized signal blocks repetition in time-domain transmission resources and frequency-domain transmission resources are jointly indicated. For example, there are 16 two-dimensional patterns of synchronized signal blocks repetition in time-domain transmission resources and frequency-domain transmission resources, which may be indicated in the auxiliary measurement information with 4-bit indication information (first indication information and second indication information).

Second manner: the first indication information and the second indication information are separately indicated.

In this manner, patterns of synchronized signal blocks repetition in time-domain transmission resources and frequency-domain transmission resources are indicated, respectively. By taking the first indication information as an example, the first indication information includes at least one of first index information used to indicate a pattern of synchronized signal blocks repetition in time-domain transmission resources, bitmap information (bitmap), group information, information of repetition times and bitmap information of repetitive synchronized signal blocks in each group. By taking the first index information as an example, there are 6 patterns of synchronized signal blocks repetition in time-domain transmission resources, which may be indicated in the auxiliary measurement information with 3-bit indication information (first indication information). By taking the bitmap as an example, the network device may also directly use a bitmap of transmission locations of synchronized signal blocks repetition in time-domain transmission resources for indication. By taking the group information as an example, the group information indicates how to divide groups and indicate which groups are transmitted, for instance, the group information indicates that 64 synchronized signal blocks are divided into 8 groups, which groups are transmitted, and synchronized signal blocks in each transmitted group are repetitively transmitted for 8 times. By taking the group information together with the information of repetition times as an example, the group information indicates how to divide groups and indicate which groups are transmitted, for instance, the group information indicates that 64 synchronized signal blocks are divided into 8 groups and which groups are transmitted; the information of repetition times indicates that K identical SS blocks are continuously repetitively transmitted in each group, and K is an integer greater than or equal to 1. When K is equal to 1, it indicates that the SS block is separately transmitted; and when K is greater than 1, it indicates that the SS block is repetitive. By taking the group information together with the information of repetition times as well as bitmap information of repetitive synchronized signal blocks in each group as an example, the group information indicates how to divide groups and indicate which groups are transmitted, for instance, the group information indicates that 64 synchronized signal blocks are divided into 8 groups and which groups are transmitted; the bitmap information and the information of repetition times together indicate that K SS blocks are repetitively transmitted in each group according to indication of the bitmap, K is an integer greater than or equal to 1. When K is equal to 1, it indicates that the SS block is separately transmitted; and when K is greater than 1, it indicates that the SS block is repetitive.

Similarly, the second indication information includes at least one of second index information used to indicate a pattern of synchronized signal blocks repetition in frequency-domain transmission resources, bitmap information (bitmap), group information, information of repetition times and bitmap information of repetitive synchronized signal blocks in each group. By taking the second index information as an example, there are 4 patterns of synchronized signal blocks repetition in frequency-domain transmission resources, which may be indicated in the auxiliary measurement information with 2-bit indication information (second indication information). By taking the bitmap as an example, the network device may also directly use a bitmap of transmission locations of repetitive synchronized signal blocks in frequency-domain transmission resources for indication. By taking the group information as an example, the group information indicates how to divide groups and indicate which groups are transmitted, for instance, the group information indicates that 64 synchronized signal blocks are divided into 8 groups, which groups are transmitted, and synchronized signal blocks in each group are repetitively transmitted for 8 times. By taking the group information together with the information of repetition times as an example, the group information indicates how to divide groups and indicate which groups are transmitted, for instance, the group information indicates that 64 synchronized signal blocks are divided into 8 groups and which groups are transmitted; the information of repetition times indicates that K identical SS blocks are continuously repetitively transmitted in each group, and K is an integer greater than or equal to 1. When K is equal to 1, it indicates that the SS block is separately transmitted; and when K is greater than 1, it indicates that the SS block is repetitive. By taking the group information together with the information of repetition times as well as bitmap information of repetitive synchronized signal blocks in each group as an example, the group information indicates how to divide groups and indicate which groups are transmitted, for instance, the group information indicates that 64 synchronized signal blocks are divided into 8 groups and which groups are transmitted; the bitmap information and the information of repetition times together indicate that K SS blocks are repetitively transmitted in each group according to indication of the bitmap, K is an integer greater than or equal to 1. When K is equal to 1, it indicates that the SS block is separately transmitted; and when K is greater than 1, it indicates that the SS block is repetitive.

Further, the quasi-co-location information indicated by the third indication information in the auxiliary measurement information specifically includes at least one of the following information: spatial quasi-co-location information of antenna port for synchronized signal blocks transmission, average gain quasi-co-location information of antenna port for synchronized signal blocks transmission, delay quasi-co-location information of antenna port for synchronized signal blocks transmission and Doppler parameter quasi-co-location information of antenna port for synchronized signal blocks transmission. It should be noted that the third indication information may include other quasi-co-location information in addition to the above listed quasi-co-location information.

The foregoing describes that the auxiliary measurement information includes at least one of the first indication information, the second indication information and the third indication information, and the auxiliary measurement information may further include at least one of the following information: fourth indication information used to indicate transmission period of synchronized signal set; and fifth indication information used to indicate actually transmitted synchronized signal block information of the synchronized signal set. That is, the auxiliary measurement information may also be used to indicate the transmission period of the SS burst set and SS blocks actually transmitted within transmission window of each SS burst set. Specifically, after the UE receives the auxiliary measurement information, if the UE obtains the fourth indication information in the auxiliary measurement information by parsing the auxiliary measurement information, the UE determines the transmission period of the synchronized signal set; if the UE obtains the fifth indication information in the auxiliary measurement information by parsing the auxiliary measurement information, the US determines actually transmitted synchronized signal block information of the synchronized signal set. The actually transmitted synchronized signal block information includes at least one of the number of transmissions, synchronized signal block index and the like.

The following describes how the UE determines synchronized signal blocks repetition according to the auxiliary measurement information with examples.

It is assumed that the UE parses the auxiliary measurement information to obtain that the auxiliary measurement information includes the third indication information and does not include the first indication information, the second indication information and the fifth indication information, that is, the UE can determine quasi-co-location information of synchronized signal block by parsing the auxiliary measurement information. Then, the UE can implicitly obtain a pattern of synchronized signal blocks repetition in the time domain and/or frequency-domain, for example, SS block indicated as QCL is considered as repetitive SS blocks.

It is assumed that the UE parses the auxiliary measurement information to obtain that the auxiliary measurement information includes the first indication information and the second indication information and does not include the third indication information and the fifth indication information, then, the UE considers repetitive SS block are quasi-co-located, according to a pattern of synchronized signal blocks repetition in the time domain.

It is assumed that the UE parses the auxiliary measurement information to obtain that the auxiliary measurement information includes the first indication information, the second indication information and the third indication information, and does not include the fifth indication information, then, the UE can jointly determine repetitive SS blocks according to a pattern of synchronized signal blocks repetition in the time domain as well as QCL information.

It is assumed that the UE parses the auxiliary measurement information to obtain that the auxiliary measurement information includes the third indication information and the fifth indication information, does not include the first indication information and the second indication information, then, the UE can implicitly obtain a pattern of synchronized signal blocks repetition in the time domain and/or frequency-domain according to QCL information of SS blocks, and then, jointly with actually transmitted synchronized signal block information of the synchronized signal set, the UE can determine actually transmitted repetitive SS blocks.

It is assumed that the UE parses the auxiliary measurement information to obtain that the auxiliary measurement information includes the first indication information, the second indication information and the fifth indication information, and does not include the third indication information, then, the UE considers that repetitive SS block are quasi-co-located, according to a pattern of synchronized signal blocks repetition in the frequency domain, and then, jointly with actually transmitted synchronized signal block information of the synchronized signal set, the UE can determine actually transmitted repetitive SS blocks.

It is assumed that the UE parses the auxiliary measurement information to obtain that the auxiliary measurement information includes the first indication information, the second indication information, the third indication information and the fifth indication information, the UE can determine actually transmitted repetitive SS blocks.

The forgoing describes procedure that the UE receives the auxiliary measurement information transmitted by the network device and how the UE determines repetitive SS blocks according to the auxiliary measurement information. The following embodiment will further describe a procedure of how to measure.

Specifically, step 22 includes: according to the above auxiliary measurement information, determining repetitive synchronized signal blocks and performing measurement on the synchronized signal blocks repetition. Measurement behaviors performed by the UE according to the auxiliary measurement information include: performing sampling and measurement on non-repetitive SS blocks detected in the time-frequency domain, respectively, and performing calculations such as RSRP, respectively; performing measurement on the repetitive SS blocks indicated by the auxiliary measurement information, and performing calculations such as RSRP.

In addition to the above measurement purposes, the synchronized signal block may be read. Specifically, information reading behavior performed by the UE according to the auxiliary measurement information includes: reading information carried by the SS block detected in the time-frequency domain, and combining and reading information carried by the repetitive SS block indicated by the auxiliary measurement information. After the step 22, the method further includes: combining and decoding the information carried in the synchronized signal blocks repetition. The procedure of combining and decoding described herein may include: decoding, by the UE, information carried by the synchronized signal block every time the UE detects the synchronized signal block; for the repetitive synchronized signal block, when an initial independent decoding fails, combining the information carried by the repetitive synchronized signal blocks and then performing secondary decoding of the combined information. The procedure of combining and decoding may include: when the UE receives the repetitive synchronized signal block, not performing independent decoding; after information carried by all the repetitive synchronized signal blocks are combined, decoding the combined information.

Specifically, steps of combining and decoding the repetitive synchronized signal block includes: combining and decoding primary synchronized signals (PSS) and secondary synchronized signals (SSS) in the repetitive synchronized signal blocks, respectively; and combining and decoding master information blocks (MIB), primary synchronized signals (PSS) and secondary synchronized signals (SSS) in the repetitive synchronized signal blocks, respectively. It should be noted that the above combining procedure refers to combining all PSSs in the repetitive synchronized signal blocks, combining SSSs in the repetitive synchronized signal blocks, and combining MIBs in the repetitive synchronized signal blocks.

The following embodiment further introduces the procedure that the UE measures and decodes the synchronized signal blocks according to the auxiliary measurement information, in combination with specific application scenarios.

Scenario One

Figure 3:
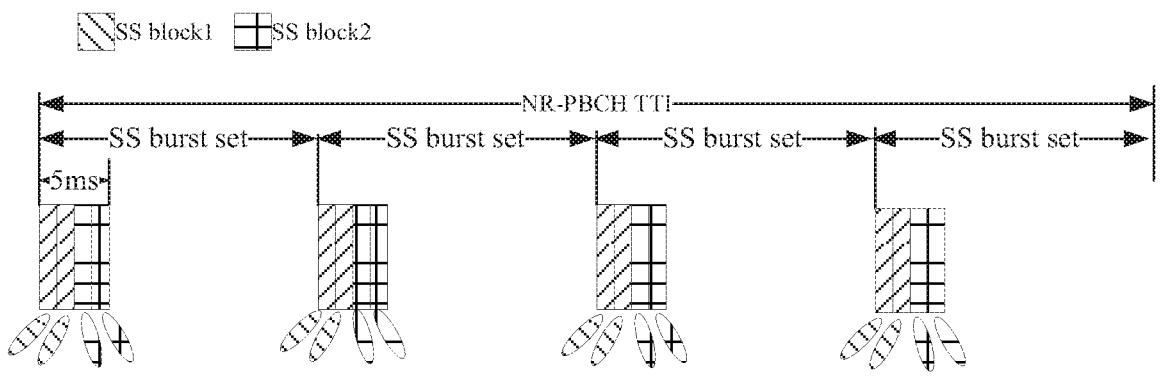
FIG. 3 is a schematic diagram showing resource mapping for a first scenario according to an embodiment of the present disclosure.

As shown in FIG. 3, it is assumed that a serving cell operates on single carrier, and the network device repetitively transmits SS blocks in the time domain. In each SS burst set period, the number of actually transmitted SS blocks is 4, including two repetitive SS block1 and two repetitive SS block2. The network device indicates QCL and a pattern of synchronized signal blocks repetition through auxiliary measurement information of synchronized signal blocks. The network device may transmit the auxiliary measurement information of synchronized signal blocks of the local cell to the UE through system information. The UE parses the auxiliary measurement information; according to the auxiliary measurement information, searches for the SS block1 which is indicated by the auxiliary measurement information as repetition, on the current carrier. Then, the UE measures the repetitive SS block1, and performs different operations according to whether MIBs are combined: when the MIBs are not combined, PSSs and SSSs carried by the repetitive SS block1 are combined and read separately; when the MIBs are combined, and PSSs, SSSs and MIBs carried by the repetitive SS block1 are combined and read separately. The repetitive SS block2 may also be measured and read in the above manner, which will not be elaborated herein.

Scenario Two

Figure 4:
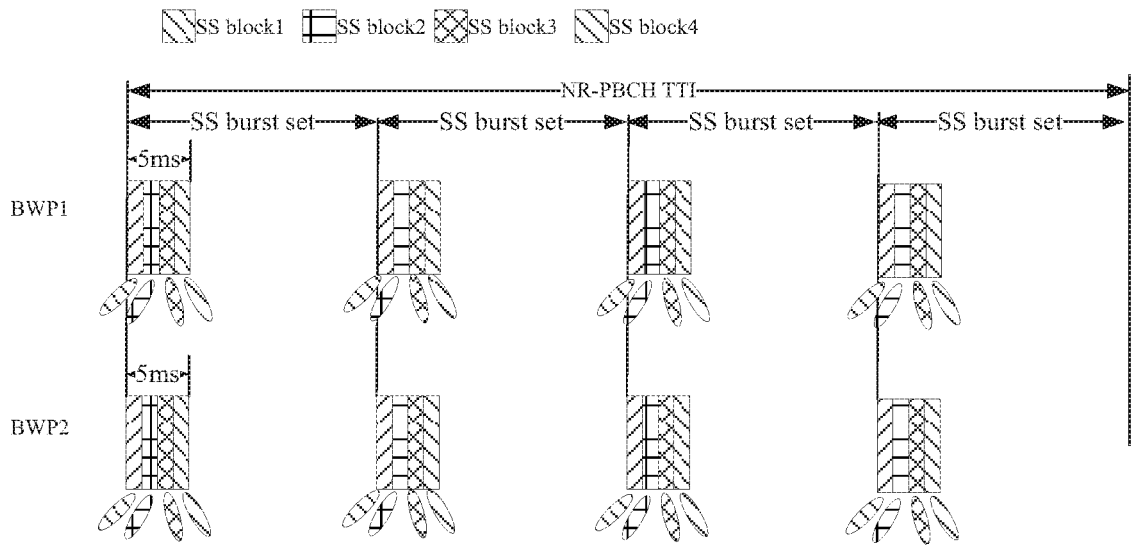
FIG. 4 is a schematic diagram showing resource mapping for a second scenario and a third scenario according to an embodiment of the present disclosure.

As shown in FIG. 4, it is assumed that the serving cell operates in a wideband scenario, and the network device repetitively transmits SS blocks in the frequency domain, and SS burst set periods in different bandwidth parts (BWPs) are the same; in each SS burst set period, the number of actually transmitted SS blocks is 4, including four different ones, i.e., SS block1, SS block2, SS block3 and SS block4. It is assumed that the repetitive SS blocks in the frequency domain share the same Control Resource Set (CORESET), and the network device indicates QCL and a pattern of synchronized signal blocks repetition through auxiliary measurement information of synchronized signal blocks. The network device may transmit the auxiliary measurement information of synchronized signal blocks of the local cell to the UE through system information. The UE parses the auxiliary measurement information, and searches for SS block at corresponding time-frequency positions of BWP1 and BWP2. At the same time point, the UE finds SS block1 which is indicated by the auxiliary measurement information as repetition, in BWP1 and BWP2, respectively. Then, the UE measures the repetitive SS block1 in the BWP1 and the BWP2, and performs different operations according to whether MIBs are combined: when the MIBs are not combined, PSSs and SSSs carried by the repetitive SS block1 are combined and read respectively; when the MIBs are combined, PSSs, SSSs and MIBs carried by the repetitive SS block1 are combined and read respectively. The repetitive SS block2, SS block3 and SS block4 may also be measured and read in the above manner, which will not be elaborated herein.

Scenario Three

As Shown in FIG. 4, it is Assumed that the Serving Cell Operates in a wideband scenario, and the network device repetitively transmits SS blocks in the frequency domain, and SS burst set periods in different bandwidth parts (BWPs) are the same; in each SS burst set period, the number of actually transmitted SS blocks is 4, including four different ones, i.e., SS block1, SS block2, SS block3 and SS block4. The repetitive SS block in the frequency domain has its own CORESET, and the network device indicates QCL of these SS blocks through auxiliary measurement information of synchronized signal blocks. Specifically, the network device may transmit the auxiliary measurement information of synchronized signal blocks of the local cell to the UE through system information. The UE parses the auxiliary measurement information, and searches for SS block at corresponding time-frequency positions of BWP1 and BWP2. At the same time point, the UE finds SS block1 which is indicated by the auxiliary measurement information as QCL, in BWP1 and BWP2, respectively, and considers that they are repetitive. Then, the UE measures the repetitive SS block1 in the BWP1 and the BWP2, and performs different operations according to whether MIBs are combined: when the MIBs are not combined, PSSs and SSSs carried by the repetitive SS block1 are combined and read respectively; when the MIBs are combined, PSSs, SSSs and MIBs carried by the repetitive SS block1 are combined and read respectively. The repetitive SS block2, SS block3 and SS block4 may also be measured and read in the above manner, which will not be elaborated herein.

Scenario Four

Figure 5:
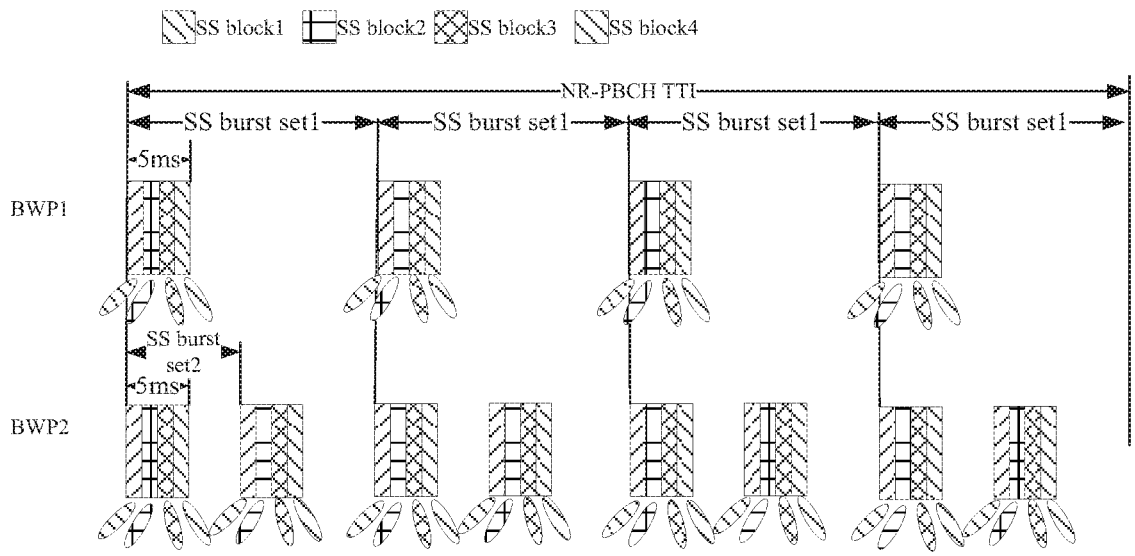
FIG. 5 is a schematic diagram showing resource mapping for a fourth scenario according to an embodiment of the present disclosure.

As shown in FIG. 5, the serving cell operates in a wideband scenario, and the network device repetitively transmits SS blocks in the frequency domain, and SS burst set periods in different bandwidth parts (BWPs) are different. In each SS burst set period, the number of actually transmitted SS blocks is 4, including four different ones, i.e., SS block1, SS block2, SS block3 and SS block4. The repetitive SS block in the frequency domain has its own CORESET, and each SS block and its CORESET may be uniformly indicated. The network device indicates a pattern of synchronized signal blocks repetition through auxiliary measurement information of synchronized signal blocks. The network device may transmit the auxiliary measurement information of synchronized signal blocks of the local cell to the UE through system information. The UE parses the auxiliary measurement information, and searches for SS block at corresponding time-frequency positions of BWP1 and BWP2. The UE finds SS block1 which is indicated by the auxiliary measurement information as repetition, in BWP1 and BWP2, respectively, and considers the repetitive SS blocks are QCL. Then, the UE measures the repetitive SS block1 in the BWP1 and the BWP2, and performs different operations according to whether MIBs are combined: when the MIBs are not combined, PSSs and SSSs carried by the repetitive SS block1 are combined and read respectively; when the MIBs are combined, PSSs, SSSs and MIBs carried by the repetitive SS block1 are combined and read respectively. The repetitive SS block2, SS block3 and SS block4 may also be measured and read in the above manner, which will not be elaborated herein.

Scenario Five

It is assumed that local cell and neighboring cell operate at the same frequency, and the local cell and the neighboring cell are associated with multiple BWPs, and the BWP associated with the local cell at the frequency is exactly the same as the BWP associated with the neighboring cell at the frequency. The "exactly the same as" means that the number of BWPs associated with the local cell and the neighboring cell at the frequency is the same, and Numerology of BWP and frequency position of BWP are the same. It is assumed that the UE is connected. The network side transmits auxiliary measurement information of synchronized signal blocks of the neighboring cell to the connected UE through RRC signaling. According to the auxiliary measurement information of the neighboring cell, the UE searches for SS block in corresponding time-frequency positions of multiple BWPs of the neighboring cell. Then, the UE measures the searched SS blocks in multiple BWPs of the neighboring cell. The UE performs sampling and measurement on detected non-repetitive SS blocks, respectively, and performs calculations such as RSRP, respectively. The UE performs measurement on the SS blocks which are indicated by the auxiliary measurement information as QCL and repetition, and performs calculations such as RSRP. After the measurement is completed, the UE feeds back a measurement report to the network device, and the network device determines whether to initiate a handover request according to content of the measurement report. In addition, the UE decodes SS blocks of the neighboring cell and performs different operations according to whether MIBs are combined: when the MIBs are not combined, PSSs and SSSs carried by the repetitive SS blocks are combined and read respectively; when the MIBs are combined, PSSs, SSSs and MIBs carried by the repetitive SS blocks are combined and read respectively.

Scenario Six

The local cell and neighboring cell operate at the same frequency, and the local cell and the neighboring cell are associated with multiple BWPs, and the BWP associated with the local cell at the frequency is exactly the same as the BWP associated with the neighboring cell at the frequency. The "exactly the same as" means that the number of BWPs associated with the local cell and the neighboring cell at the frequency is the same, Numerology of BWP and frequency position of BWP are the same. It is assumed that the UE is idle. The network side transmits auxiliary measurement information of synchronized signal blocks of the neighboring cell to the idle UE through system information. According to the auxiliary measurement information, the UE searches for SS block in corresponding time-frequency positions of multiple BWPs of the neighboring cell. Then, the UE measures the searched SS blocks of the neighboring cell. The UE performs sampling and measurement on detected non-repetitive SS blocks, respectively, and performs calculations such as RSRP, respectively. The UE performs measurement on the SS blocks which are indicated by the auxiliary measurement information as QCL and repetition, and performs calculations such as RSRP. After the measurement is completed, the UE can determine whether to perform cell reselection according to the measurement result. In addition, the UE decodes SS blocks of the neighboring cell and performs different operations according to whether MIBs are combined: when the MIBs are not combined, PSSs and SSSs carried by the repetitive SS blocks are combined and read respectively; when the MIBs are combined, PSSs, SSSs and MIBs carried by the repetitive SS blocks are combined and read respectively.

Scenario Seven

In the high-speed scenario, it is assumed that the serving cell operates in a wideband, and the network device repetitively transmits SS blocks in the frequency domain, and SS burst set periods in different bandwidth parts (BWPs) are the same. The network device may transmit the auxiliary measurement information of synchronized signal blocks of the local cell to the UE through system information. According to the auxiliary measurement information, the UE searches for SS block in corresponding time-frequency positions of multiple BWPs of the local cell. Then, the UE measures the searched SS blocks of the local cell. The UE performs sampling and measurement on detected non-repetitive SS blocks, respectively, and performs calculations such as RSRP, respectively. The UE performs measurement on the SS blocks which are indicated by the auxiliary measurement information as QCL and repetition, and performs calculations such as RSRP. The UE performs different operations according to whether MIBs are combined: when the MIBs are not combined, PSSs and SSSs carried by the repetitive SS blocks are combined and read respectively; when the MIBs are combined, PSSs, SSSs and MIBs carried by the repetitive SS blocks are combined and read respectively.

Scenario Eight

It is assumed that the local cell and the neighboring cell operate at the same frequency, and the local cell and the neighboring cell are associated with multiple BWPs, and the BWP associated with the local cell at the frequency are partially the same or different from the BWP associated with the neighboring cell at the frequency. It is assumed that the UE is connected. The network side transmits auxiliary measurement information of synchronized signal blocks of the neighboring cell to the connected UE through RRC signaling. According to the auxiliary measurement information, the UE searches for SS block in corresponding positions of multiple BWPs of the neighboring cell. Then, the UE measures the searched SS blocks of multiple BWPs of the neighboring cell. The UE performs sampling and measurement on detected non-repetitive SS blocks, respectively, and performs calculations such as RSRP, respectively. The UE performs measurement on the SS blocks which are indicated by the auxiliary measurement information as QCL and repetition, and performs calculations such as RSRP. After the measurement is completed, the UE feeds back a measurement report to a base station, and the base station determines whether to initiate a handover request according to content of the measurement report. In addition, the UE decodes SS blocks of the neighboring cell and performs different operations according to whether MIBs are combined: when the MIBs are not combined, PSSs and SSSs carried by the repetitive SS blocks are combined and read respectively; when the MIBs are combined, PSSs, SSSs and MIBs carried by the repetitive SS blocks are combined and read respectively.

Scenario Nine

It is assumed that the local cell and the neighboring cell operate at the same frequency, and the local cell and the neighboring cell are associated with multiple BWPs, and the BWP associated with the local cell at the frequency are partially the same or different from the BWP associated with the neighboring cell at the frequency. It is assumed that the UE is idle. The network side transmits auxiliary measurement information of synchronized signal blocks of the neighboring cell to the idle UE through system information. According to the auxiliary measurement information, the UE searches for SS block in corresponding time-frequency positions of multiple BWPs of the neighboring cell. Then, the UE measures the searched SS blocks of the neighboring cell. The UE performs sampling and measurement on detected non-repetitive SS blocks, respectively, and performs calculations such as RSRP, respectively. The UE performs measurement on the SS blocks which are indicated by the auxiliary measurement information as QCL and repetition, and performs calculations such as RSRP. After the measurement is completed, the UE can determine whether to perform cell reselection according to the measurement result. In addition, the UE decodes SS blocks of the neighboring cell and performs different operations according to whether MIBs are combined: when the MIBs are not combined, PSSs and SSSs carried by the repetitive SS blocks are combined and read respectively; when the MIBs are combined, PSSs, SSSs and MIBs carried by the repetitive SS blocks are combined and read respectively.

In summary, in the method of synchronized signal block measurement in various scenarios of the embodiment of the present disclosure, the UE receives the auxiliary measurement information transmitted by the network device for assisting the synchronized signal block measurement, and performs synchronized signal block measurement according to the auxiliary measurement information. Since the auxiliary measurement information carries the transmission configuration information indicating transmission configuration of the synchronized signal block, the UE can obtain the transmission configuration of the synchronized signal blocks. This facilitates the UE for quickly detecting the corresponding synchronized signal block, thereby reducing blind detection difficulty, blind detection time and measurement time, improving measurement accuracy, accelerating cell access/reselection/handover, and achieving energy saving in the UE.

The above embodiments describe the method of synchronized signal block measurement in different scenarios, respectively. The following embodiments will further introduce the corresponding UE in conjunction with the accompanying drawings.

Figure 6:
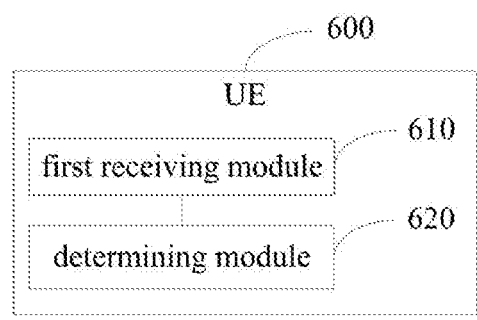
FIG. 6 is a schematic diagram of a user equipment according to an embodiment of the present disclosure.

As shown in FIG. 6, the UE 600 of the embodiment of the present disclosure can implement details of the method of synchronized signal block measurement in the foregoing embodiment with the same effect achieved, including: receiving auxiliary measurement information, which is transmitted by a network device and is used to assist the UE to perform synchronized signal block measurement; according to the auxiliary measurement information, determining repetitive synchronized signal blocks and performing measurement. The UE 600 specifically includes the following functional modules:

a first receiving module 610 used to receive auxiliary measurement information, which is transmitted by a network device and is used to assist the UE to perform synchronized signal block measurement; where the auxiliary measurement information is used to indicate transmission configuration information of synchronized signal blocks;

a determining module 620 used to determine repetitive synchronized signal blocks and perform measurement according to the auxiliary measurement information.

Specifically, the auxiliary measurement information includes at least one of the following information:

first indication information used to indicate pattern of synchronized signal blocks repetition in time-domain transmission resources;

second indication information used to indicate pattern of synchronized signal blocks repetition in frequency-domain transmission resources; and third indication information used to indicate Quasi Co-Location (QCL) information of the synchronized signal blocks.

The pattern indicated by the first indication information includes at least one of the following information: position information of candidate time-domain transmission resources for synchronized signal blocks repetition, position information of time-domain transmission resources actually used for synchronized signal blocks repetition, information of allowed repetition times of synchronized signal blocks in time-domain transmission resources, and information of actual repetition times of synchronized signal blocks in time-domain transmission resources.

The pattern indicated by the second indication information includes at least one of the following information: position information of candidate frequency-domain transmission resources for synchronized signal blocks repetition, position information of frequency-domain transmission resources actually used for synchronized signal blocks repetition, information of allowed repetition times of synchronized signal blocks in frequency-domain transmission resources, information of actual repetition times of synchronized signal blocks in frequency-domain transmission resources, numerology information of candidate frequency-domain transmission resources allowed for synchronized signal blocks repetition, and numerology information of frequency-domain transmission resources actually used for synchronized signal blocks repetition.

The quasi-co-location information indicated by the third indication information includes at least one of the following information: spatial quasi-co-location information of antenna port for synchronized signal blocks transmission, average gain quasi-co-location information of antenna port for synchronized signal blocks transmission, delay quasi-co-location information of antenna port for synchronized signal blocks transmission and Doppler parameter quasi-co-location information of antenna port for synchronized signal blocks transmission.

When the auxiliary measurement information includes the first indication information and the second indication information, the first indication information and the second indication information may be separately indicated, or, the first indication information and the second indication information may also be jointly indicated.

The first indication information and the second indication information form a joint index information. The joint index information is used to indicate a pattern of synchronized signal blocks repetition in time-domain transmission resources and frequency-domain transmission resources.

The first indication information includes at least one of first index information used to indicate a pattern of synchronized signal blocks repetition in time-domain transmission resources, bitmap information (bitmap), group information, information of repetition times and bitmap information of repetitive synchronized signal blocks in each group.

The second indication information includes at least one of second index information used to indicate a pattern of synchronized signal blocks repetition in frequency-domain transmission resources, bitmap information (bitmap), group information, information of repetition times and bitmap information of repetitive synchronized signal blocks in each group.

The auxiliary measurement information may further include at least one of the following information:

fourth indication information used to indicate transmission period of synchronized signal set; and fifth indication information used to indicate actually transmitted synchronized signal block information of the synchronized signal set.

The first receiving module 610 includes: a first receiving unit used to receive through system information or RRC layer signaling, the auxiliary measurement information which is transmitted by the network device and is used to assist the UE to perform synchronized signal block measurement.

The UE 600 further includes: a processing module used to combine and decode information carried in the synchronized signal blocks repetition.

The processing module includes:

a first processing unit used to combine and decode primary synchronized signals (PSS) and secondary synchronized signals (SSS) in the synchronized signal blocks repetition, respectively; or, a second processing unit used to combine and decode master information blocks (MIB), primary synchronized signals (PSS), secondary synchronized signals (SSS) in the synchronized signal blocks repetition, respectively.

It is to be noted that the UE of the embodiment of the present disclosure receives the auxiliary measurement information transmitted by the network device for assisting the synchronized signal block measurement, and performs synchronized signal block measurement according to the auxiliary measurement information. Since the auxiliary measurement information carries the transmission configuration information indicating transmission configuration of the synchronized signal block, the UE can obtain the transmission configuration of the synchronized signal blocks. This facilitates the UE for quickly detecting the corresponding synchronized signal block, thereby reducing blind detection difficulty, blind detection time and measurement time, improving measurement accuracy, accelerating cell access/reselection/handover, and achieving energy saving in the UE.

In order to better achieve the above purpose, one embodiment of the present disclosure further provides a UE, including a processor, a memory and a computer program stored on the memory and executable on the processor. The processor executes the computer program to implement steps of the above method of synchronized signal block measurement. One embodiment of the present disclosure further provides a computer readable storage medium including a computer program stored thereon, the computer program being executed by a processor to implement the steps of the above method of synchronized signal block measurement.

Specifically, FIG. 7 is a block diagram of a UE 700 according to another embodiment of the present disclosure. The UE shown in FIG. 7 includes at least one processor 701, a memory 702, a user interface 703 and a network interface 704.

Each component in the UE 700 is coupled together via a bus system 705. It can be understood that the bus system 705 is used to implement the connection and communication among the components. The bus system 705 includes a power bus, control bus, state signal bus besides a data bus. For the clarity of description, each bus in FIG. 7 is denoted as the bus system 705.

The user interface 703 may include a monitor or clickable device (for example, touchpad, or touch screen).

It can be understood that the memory 702 in embodiments of the present disclosure may be a volatile storage or a nonvolatile storage, or both the volatile storage and nonvolatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be a Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRS-DRAM), Enhanced SDRAM (ESDRAM), Synchronization Link DRAM (SLDRAM) and Direct Rambus RAM (DR-RAM). The memory 702 in the system and method described in embodiments of the present disclosure include, but is not limited to, these and any other suitable types of storages.

In some embodiments, the memory 702 stores following elements, such as executable modules, data structure, subset thereof, or superset thereof: OS 7021 and an application program 7022.

The OS 7021 includes various kinds of system programs, such as a framework layer, a core library layer and a driver layer, which are used to implement various kinds of basic services and process hardware-based tasks. The application program 7022 includes various kinds of application programs, such as Media Player and Browser, which are used to implement various kinds of application services. Programs, which are used to implement the methods in embodiments of the present disclosure, may be included in the application program 7022.

In one embodiment of the present disclosure, the UE 700 further includes a computer program stored on the memory 702 and executable on the processor 701. The computer program may be a computer program in the application program 7022. The processor 701 executes the computer program to implement steps: receiving auxiliary measurement information, which is transmitted by a network device and is used to assist the UE to perform synchronized signal block measurement, where the auxiliary measurement information is used to indicate transmission configuration information of synchronized signal blocks; according to the auxiliary measurement information, determining repetitive synchronized signal blocks and performing measurement.

The methods in the above embodiments of the present disclosure may be applied to or implemented by the processor 701. The processor 701 may be an integrated circuit chip with signal processing capability. In the implementation process, each step of the above method can be completed by the integrated logic circuit of the hardware in processor 701 or the instructions in the form of software.

The processor 701 mentioned above may be a general purpose Processor, Digital Signal Processor (DSP), Application Specific Integrated Circuit (ASIC), Field Programmable Gate Array (FPGA) or other Programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in the memory 702, and the processor 701 reads the information in the memory 702 to implement steps in the above method in combination with the hardware.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Specifically, the auxiliary measurement information includes at least one of the following information:

first indication information used to indicate pattern of synchronized signal blocks repetition in time-domain transmission resources;

second indication information used to indicate pattern of synchronized signal blocks repetition in frequency-domain transmission resources; and third indication information used to indicate Quasi Co-Location (QCL) information of the synchronized signal blocks.

The pattern indicated by the first indication information includes at least one of the following information: position information of candidate time-domain transmission resources for synchronized signal blocks repetition, position information of time-domain transmission resources actually used for synchronized signal blocks repetition, information of allowed repetition times of synchronized signal blocks in time-domain transmission resources, and information of actual repetition times of synchronized signal blocks in time-domain transmission resources.

The pattern indicated by the second indication information includes at least one of the following information: position information of candidate frequency-domain transmission resources for synchronized signal blocks repetition, position information of frequency-domain transmission resources actually used for synchronized signal blocks repetition, information of allowed repetition times of synchronized signal blocks in frequency-domain transmission resources, information of actual repetition times of synchronized signal blocks in frequency-domain transmission resources, numerology information of candidate frequency-domain transmission resources allowed for synchronized signal blocks repetition, and numerology information of frequency-domain transmission resources actually used for synchronized signal blocks repetition.

The quasi-co-location information indicated by the third indication information includes at least one of the following information: spatial quasi-co-location information of antenna port for synchronized signal blocks transmission, average gain quasi-co-location information of antenna port for synchronized signal blocks transmission, delay quasi-co-location information of antenna port for synchronized signal blocks transmission and Doppler parameter quasi-co-location information of antenna port for synchronized signal blocks transmission.

Specifically, when the auxiliary measurement information includes the first indication information and the second indication information, the first indication information and the second indication information may be separately indicated, or, the first indication information and the second indication information may also be jointly indicated.

Specifically, the first indication information and the second indication information form a joint index information. The joint index information is used to indicate a pattern of synchronized signal blocks repetition in time-domain transmission resources and frequency-domain transmission resources.

Specifically, the first indication information includes at least one of first index information used to indicate a pattern of synchronized signal blocks repetition in time-domain transmission resources, bitmap information (bitmap), group information, information of repetition times and bitmap information of repetitive synchronized signal blocks in each group.

The second indication information includes at least one of second index information used to indicate a pattern of synchronized signal blocks repetition in frequency-domain transmission resources, bitmap information (bitmap), group information, information of repetition times and bitmap information of repetitive synchronized signal blocks in each group.

Specifically, the auxiliary measurement information may further include at least one of the following information:

fourth indication information used to indicate transmission period of synchronized signal set; and fifth indication information used to indicate actually transmitted synchronized signal block information of the synchronized signal set.

Specifically, when the computer program is executed by the processor 701 to implement the following steps: receiving through system information or RRC layer signaling, the auxiliary measurement information which is transmitted by the network device and is used to assist the UE to perform synchronized signal block measurement.

Specifically, when the computer program is executed by the processor 701 to implement the following steps: combining and decoding information carried in the synchronized signal blocks repetition.

Specifically, when the computer program is executed by the processor 701 to implement the following steps: combining and decoding primary synchronized signals (PSS) and secondary synchronized signals (SSS) in the synchronized signal blocks repetition, respectively; or, combining and decoding master information blocks (MIB), primary synchronized signals (PSS), secondary synchronized signals (SSS) in the synchronized signal blocks repetition, respectively.

The UE may be a wireless terminal or a wired terminal. The wireless terminal may be a device that provides voice and/or other service data connectivity to the user, a handheld device with a wireless connection function, or other processing device connected to a wireless modem. The wireless terminal may communicate with one or more core networks via a Radio Access Network (RAN). The wireless terminal may be a mobile terminal, such as a mobile phone (or "cellular" phone) and a computer with the mobile terminal, such as a portable, pocket, handheld, computer built-in or in-vehicle mobile device that exchanges language and/or data with the wireless access network. For example, Personal Communication Service (PCS) telephone, cordless telephone, Session Initiation Protocol (SIP) telephone, Wireless Local Loop (WLL) station, personal digital assistant (PDA). The wireless terminal may also be referred to as a system, a subscriber unit, a subscriber station, a mobile station, a mobile, a remote station, a remote terminal, an access terminal, user terminal, user agent, user device or user equipment, which are not limited herein.

The UE of the embodiment of the present disclosure receives the auxiliary measurement information transmitted by the network device for assisting the synchronized signal block measurement, and performs synchronized signal block measurement according to the auxiliary measurement information. Since the auxiliary measurement information carries the transmission configuration information indicating transmission configuration of the synchronized signal block, the UE can obtain the transmission configuration of the synchronized signal blocks. This facilitates the UE for quickly detecting the corresponding synchronized signal block, thereby reducing blind detection difficulty, blind detection time and measurement time, improving measurement accuracy, accelerating cell access/reselection/handover, and achieving energy saving in the UE.

The above embodiment introduces the method of synchronized signal block measurement of the present disclosure at the UE. The following embodiment will further introduce the method of synchronized signal block measurement at the network device with reference to the accompanying drawings.

As shown in FIG. 8, one embodiment of the present disclosure provides a method of synchronized signal block measurement, applied to a network device, specifically including the following steps:

Step 81: transmitting to UE, auxiliary measurement information which is used to assist the UE to perform synchronized signal block measurement.

The auxiliary measurement information is used to indicate transmission configuration information of synchronized signal blocks. The network device may repetitively transmit the synchronized signal blocks by the same beam at multiple transmission positions of one or more domains in the time domain and the frequency domain. The synchronized signal block includes a physical broadcast channel, a primary synchronized signal and a secondary synchronized signal. After transmitting synchronized signal blocks to the UE, the network device further transmits to the UE the auxiliary measurement information which indicates the transmission configuration information of these synchronized signal blocks.

Specifically, the step 81 may be specifically implemented by: transmitting through system information or radio resource control (RRC) layer signaling, the auxiliary measurement information which is used to assist the UE to perform synchronized signal block measurement. The system information includes at least one of system Master Information Block (MIB), Remaining Minimum System Information (RMSI) and other System Information (OSI).

The above auxiliary measurement information includes at least one of the following information: first indication information used to indicate pattern of synchronized signal blocks repetition in time-domain transmission resources; second indication information used to indicate pattern of synchronized signal blocks repetition in frequency-domain transmission resources; and third indication information used to indicate Quasi Co-Location (QCL) information of the synchronized signal blocks.

Further, the first indication information is used to indicate a pattern of synchronized signal blocks repetition in the time domain at the current frequency domain position. This pattern needs to indicate information of the synchronized signal blocks repetition in the time domain, such as, at which time-domain locations there are synchronized signal blocks repetition in the time domain, and the number of repetition times of synchronized signal blocks in the time domain at these time-domain locations. Specifically, the pattern indicated by the first indication information includes at least one of the following information: position information of candidate time-domain transmission resources for synchronized signal blocks repetition, position information of time-domain transmission resources actually used for synchronized signal blocks repetition, information of allowed repetition times of synchronized signal blocks in time-domain transmission resources, and information of actual repetition times of synchronized signal blocks in time-domain transmission resources.

Similarly, the second indication information is used to indicate a pattern of synchronized signal blocks repetition in the frequency domain. This pattern needs to indicate information of the synchronized signal blocks repetition in the frequency domain, such as, at which frequency-domain locations there are synchronized signal blocks repetition in the frequency domain, numerology information of these frequency-domain locations, and the number of repetition times of synchronized signal blocks in the frequency domain at these frequency-domain locations. Specifically, the pattern indicated by the second indication information includes at least one of the following information: position information of candidate frequency-domain transmission resources for synchronized signal blocks repetition, position information of frequency-domain transmission resources actually used for synchronized signal blocks repetition, information of allowed repetition times of synchronized signal blocks in frequency-domain transmission resources, information of actual repetition times of synchronized signal blocks in frequency-domain transmission resources, numerology information of candidate frequency-domain transmission resources allowed for synchronized signal blocks repetition, and numerology information of frequency-domain transmission resources actually used for synchronized signal blocks repetition.

It should be noted that both of the first indication information and the second indication information refer to the patterns of synchronized signal blocks repetition, and the pattern may be a default pattern, a predefined pattern, and a pattern directly configured by the network device. Indication manners for different patterns may refer to the indication manners introduced for the UE, which will not be elaborated herein.

Specifically, when the auxiliary measurement information includes the first indication information and the second indication information, the first indication information and the second indication information may be separately indicated, and the first indication information and the second indication information may also be jointly indicated. The above two indication modes will be further described in details hereinafter with reference to specific examples.

In a jointly indicating manner, the first indication information and the second indication information form a joint index information. The joint index information is used to indicate a pattern of synchronized signal blocks repetition in time-domain transmission resources and frequency-domain transmission resources. That is to say, patterns of synchronized signal blocks repetition in time-domain transmission resources and frequency-domain transmission resources are jointly indicated. In a separately indicating manner, patterns of synchronized signal blocks repetition in time-domain transmission resources and frequency-domain transmission resources are indicated, respectively. By taking the first indication information as an example, the first indication information includes at least one of first index information used to indicate a pattern of synchronized signal blocks repetition in time-domain transmission resources, bitmap information (bitmap), group information, information of repetition times and bitmap information of repetitive synchronized signal blocks in each group. By taking the first index information as an example, there are 6 patterns of synchronized signal blocks repetition in time-domain transmission resources, which may be indicated in the auxiliary measurement information with 3-bit indication information (first indication information). By taking the bitmap as an example, the network device may also directly use a bitmap of transmission locations of repetitive synchronized signal blocks in time-domain transmission resources for indication. By taking the group information as an example, the group information indicates how to divide groups and indicate which groups are transmitted, for instance, the group information indicates that 64 synchronized signal blocks are divided into 8 groups, which groups are transmitted, and synchronized signal blocks in each transmitted group are repetitively transmitted for 8 times. By taking the group information together with the information of repetition times as an example, the group information indicates how to divide groups and indicate which groups are transmitted, for instance, the group information indicates that 64 synchronized signal blocks are divided into 8 groups and which groups are transmitted, the information of repetition times indicates that K identical SS blocks are continuously repetitively transmitted in each group, and K is an integer greater than or equal to 1. When K is equal to 1, it indicates that the SS block is separately transmitted, and when K is greater than 1, it indicates that the SS block is repetitive. By taking the group information together with the information of repetition times as well as bitmap information of repetitive synchronized signal blocks in each group as an example, the group information indicates how to divide groups and indicate which groups are transmitted, for instance, the group information indicates that 64 synchronized signal blocks are divided into 8 groups and which groups are transmitted, the bitmap information and the information of repetition times together indicate that K SS blocks are repetitively transmitted in each group according to indication of the bitmap, K is an integer greater than or equal to 1. When K is equal to 1, it indicates that the SS block is separately transmitted; and when K is greater than 1, it indicates that the SS block is repetitive.

Similarly, the second indication information includes at least one of second index information used to indicate a pattern of synchronized signal blocks repetition in frequency-domain transmission resources, bitmap information (bitmap), group information, information of repetition times and bitmap information of repetitive synchronized signal blocks in each group. By taking the second index information as an example, there are 4 patterns of synchronized signal blocks repetition in frequency-domain transmission resources, which may be indicated in the auxiliary measurement information with 2-bit indication information (second indication information). By taking the bitmap as an example, the network device may also directly use a bitmap of transmission locations of repetitive synchronized signal blocks in frequency-domain transmission resources for indication. By taking the group information as an example, the group information indicates how to divide groups and indicate which groups are transmitted, for instance, the group information indicates that 64 synchronized signal blocks are divided into 8 groups, which groups are transmitted, and synchronized signal blocks in each group are repetitively transmitted for 8 times. By taking the group information together with the information of repetition times as an example, the group information indicates how to divide groups and indicate which groups are transmitted, for instance, the group information indicates that 64 synchronized signal blocks are divided into 8 groups and which groups are transmitted; the information of repetition times indicates that K identical SS blocks are continuously repetitively transmitted in each group, and K is an integer greater than or equal to 1. When K is equal to 1, it indicates that the SS block is separately transmitted; and when K is greater than 1, it indicates that the SS block is repetitive. By taking the group information together with the information of repetition times as well as bitmap information of repetitive synchronized signal blocks in each group as an example, the group information indicates how to divide groups and indicate which groups are transmitted, for instance, the group information indicates that 64 synchronized signal blocks are divided into 8 groups and which groups are transmitted; the bitmap information and the information of repetition times together indicate that K SS blocks are repetitively transmitted in each group according to indication of the bitmap, K is an integer greater than or equal to 1. When K is equal to 1, it indicates that the SS block is separately transmitted; and when K is greater than 1, it indicates that the SS block is repetitive.

Further, the quasi-co-location information indicated by the third indication information in the auxiliary measurement information specifically includes at least one of the following information: spatial quasi-co-location information of antenna port for synchronized signal blocks transmission, average gain quasi-co-location information of antenna port for synchronized signal blocks transmission, delay quasi-co-location information of antenna port for synchronized signal blocks transmission and Doppler parameter quasi-co-location information of antenna port for synchronized signal blocks transmission. It should be noted that the third indication information may include other quasi-co-location information in addition to the above listed quasi-co-location information.

The foregoing describes that the auxiliary measurement information includes at least one of the first indication information, the second indication information and the third indication information, and the auxiliary measurement information may further include at least one of the following information: fourth indication information used to indicate transmission period of synchronized signal set; and fifth indication information used to indicate actually transmitted synchronized signal block information of the synchronized signal set.

In the method of synchronized signal block measurement of the present disclosure, the network device transmits to the UE the auxiliary measurement information for assisting the synchronized signal block measurement. The UE performs synchronized signal block measurement according to the auxiliary measurement information. Since the auxiliary measurement information carries the transmission configuration information indicating transmission configuration of the synchronized signal block, the UE can obtain the transmission configuration of the synchronized signal blocks. This facilitates the UE for quickly detecting the corresponding synchronized signal block, thereby reducing blind detection difficulty, blind detection time and measurement time, improving measurement accuracy, accelerating cell access/reselection/handover, and achieving energy saving in the UE.

The above embodiments describe the method of synchronized signal block measurement in different scenarios, respectively. The following embodiments will further introduce the corresponding network device in conjunction with the accompanying drawings.

As shown in FIG. 9, the network device 900 of the embodiment of the present disclosure can implement details of the method of synchronized signal block measurement in the foregoing embodiment with the same effect achieved, including: transmitting to UE, auxiliary measurement information which is used to assist the UE to perform synchronized signal block measurement, where the auxiliary measurement information is used to indicate transmission configuration information of synchronized signal blocks. The network device 900 specifically includes the following functional modules: a first transmission module 910 used to transmit to UE, auxiliary measurement information which is used to assist the UE to perform synchronized signal block measurement. The auxiliary measurement information is used to indicate transmission configuration information of synchronized signal blocks.

Specifically, the auxiliary measurement information includes at least one of the following information:

first indication information used to indicate pattern of synchronized signal blocks repetition in time-domain transmission resources;

second indication information used to indicate pattern of synchronized signal blocks repetition in frequency-domain transmission resources; and third indication information used to indicate Quasi Co-Location (QCL) information of the synchronized signal blocks.

The pattern indicated by the first indication information includes at least one of the following information: position information of candidate time-domain transmission resources for synchronized signal blocks repetition, position information of time-domain transmission resources actually used for synchronized signal blocks repetition, information of allowed repetition times of synchronized signal blocks in time-domain transmission resources, and information of actual repetition times of synchronized signal blocks in time-domain transmission resources.

The pattern indicated by the second indication information includes at least one of the following information:

position information of candidate frequency-domain transmission resources for synchronized signal blocks repetition, position information of frequency-domain transmission resources actually used for synchronized signal blocks repetition, information of allowed repetition times of synchronized signal blocks in frequency-domain transmission resources, information of actual repetition times of synchronized signal blocks in frequency-domain transmission resources, numerology information of candidate frequency-domain transmission resources allowed for synchronized signal blocks repetition, and numerology information of frequency-domain transmission resources actually used for synchronized signal blocks repetition.

The quasi-co-location information indicated by the third indication information includes at least one of the following information: spatial quasi-co-location information of antenna port for synchronized signal blocks transmission, average gain quasi-co-location information of antenna port for synchronized signal blocks transmission, delay quasi-co-location information of antenna port for synchronized signal blocks transmission and Doppler parameter quasi-co-location information of antenna port for synchronized signal blocks transmission.

When the auxiliary measurement information includes the first indication information and the second indication information, the first indication information and the second indication information may be separately indicated, or, the first indication information and the second indication information may also be jointly indicated.

The first indication information and the second indication information form a joint index information. The joint index information is used to indicate a pattern of synchronized signal blocks repetition in time-domain transmission resources and frequency-domain transmission resources.

The first indication information includes at least one of first index information used to indicate a pattern of synchronized signal blocks repetition in time-domain transmission resources, bitmap information (bitmap), group information, information of repetition times and bitmap information of repetitive synchronized signal blocks in each group.

The second indication information includes at least one of second index information used to indicate a pattern of synchronized signal blocks repetition in frequency-domain transmission resources, bitmap information (bitmap), group information, information of repetition times and bitmap information of repetitive synchronized signal blocks in each group.

The auxiliary measurement information may further include at least one of the following information:

fourth indication information used to indicate transmission period of synchronized signal set; and fifth indication information used to indicate actually transmitted synchronized signal block information of the synchronized signal set.

The first transmission module 910 includes: a transmission unit used to transmit to the UE through system information or RRC layer signaling, the auxiliary measurement information which is used to assist the UE to perform synchronized signal block measurement.

It should be noted that division of various modules of the above network device and the UE are only division of logical functions. In actual implementation, they may be integrated into one physical entity in whole or in part, or may be physically separated. These modules may all be implemented in form of software called by processing elements; they may also all be implemented in hardware; or, some modules may be implemented in the form of software called by processing elements, and some modules may be implemented in hardware. For example, the determining module may be a separate processing element, or it may be integrated and implemented in a certain chip of the above device. In addition, it may also be stored in the form of program codes in the memory of the above device, and a certain processing element of the above device may call the program codes to implement functions of the above determining module. The implementation of other modules is similar. In addition, all or part of these modules may be integrated together, or they may be implemented independently. The processing element described herein may be an integrated circuit with signal processing capabilities. In the implementation process, each step of the above method or each module may be completed by an integrated logic circuit of hardware in the processing element or instructions in the form of software.

For example, the above modules may be one or more integrated circuits used to implement the above method, such as one or more Application Specific Integrated Circuits (ASICs), or one or more digital signal processors (DSP), one or more Field Programmable Gate Arrays (FPGAs). For another example, when one of the above modules is implemented in the form of calling program codes by a processing component, the processing component may be a general purpose processor, such as a central processing unit (CPU) or other processor that can call the program codes. As another example, these modules may be integrated and implemented in the form of a system-on-a-chip (SOC).

It is to be noted that the network device of the embodiment of the present disclosure transmits to the UE the auxiliary measurement information for assisting the synchronized signal block measurement, and the UE performs synchronized signal block measurement according to the auxiliary measurement information. Since the auxiliary measurement information carries the transmission configuration information indicating transmission configuration of the synchronized signal block, the UE can obtain the transmission configuration of the synchronized signal blocks. This facilitates the UE for quickly detecting the corresponding synchronized signal block, thereby reducing blind detection difficulty, blind detection time and measurement time, improving measurement accuracy, accelerating cell access/reselection/handover, and achieving energy saving in the UE.

In order to better achieve the above purpose, one embodiment of the present disclosure further provides a network device, including a processor, a memory and a computer program stored on the memory and executable on the processor. The processor executes the computer program to implement steps of the above method of synchronized signal block measurement. One embodiment of the present disclosure further provides a computer readable storage medium including a computer program stored thereon, the computer program being executed by a processor to implement the steps of the above method of synchronized signal block measurement.

Figure 10:
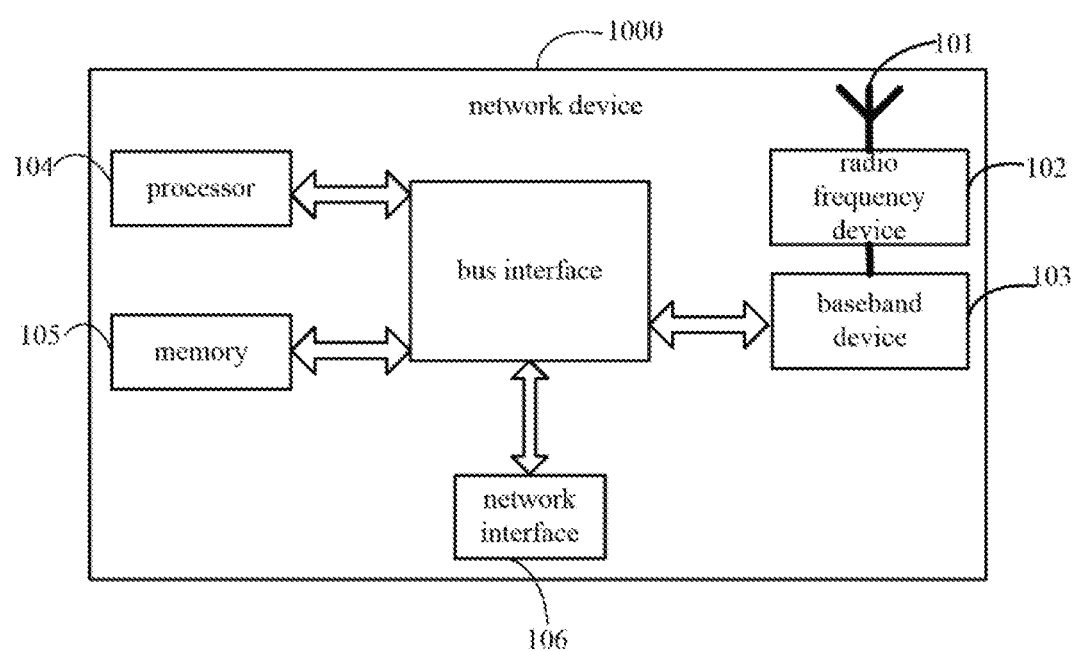
FIG. 10 is a block diagram of a network device according to an embodiment of the present disclosure.

Specifically, one embodiment of the present disclosure further provides a network device. As shown in FIG. 10, the network device 1000 includes an antenna 101, a radio frequency device 102 and a baseband device 103. The antenna 101 is coupled with the radio frequency device 102. In the uplink direction, the radio frequency device 102 receives information through the antenna 101, and transmits the received information to the baseband device 103 for processing. In the downlink direction, the baseband device 103 processes the information to be transmitted and transmits it to the radio frequency device 102. The radio frequency device 102 processes the received information and transmits it via the antenna 101.

The above band processing device may be located in the baseband device 103, and the method performed by the network device in the above embodiment may be implemented in the baseband device 103, which includes a processor 104 and a memory 105.

The baseband device 103 may include, for example, at least one baseband board on which chips are disposed. As shown in FIG. 10, one of the chips is, for example, a processor 104 coupled with the memory 105 to call a program in the memory 105 to execute operations of the network device in the above method embodiment.

The baseband device 103 may further include a network interface 106 for interacting with the radio frequency device 102, such as a common public radio interface (CPRI).

The processor herein may be a processor or a collective name of multiple processing elements. For example, the processor may be a CPU, an ASIC, or one or more integrated circuits used to implement the method performed by the above network device, such as one or more DSPs, or one or more field programmable gate arrays FPGAs. The memory may be a memory or a collective name for a plurality of storage elements.

The memory 105 may be either volatile memory or non-volatile memory, or may include both volatile and non-volatile memories. The non-volatile memory may be a Read-Only Memory (ROM), a Programmable ROM (PROM), an Erasable PROM (EPROM), electrically erasable programmable read only memory (EEPROM) or flash memory. The volatile memory may be a Random Access Memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Direct Rambus RAM (DRRAM). The memory 105 described herein is intended to include, without being limited to, these and any other suitable types of memory.

Specifically, the network device of the embodiment of the present disclosure further includes: a computer program stored on the memory 105 and executable on the processor 104. The processor 104 calls the computer program in the memory 105 to execute the method executed by various modules shown in FIG. 9.

Specifically, the computer program is called by the processor 104 to perform: transmitting to UE, auxiliary measurement information which is used to assist the UE to perform synchronized signal block measurement. The auxiliary measurement information is used to indicate transmission configuration information of synchronized signal blocks.

Specifically, the auxiliary measurement information includes at least one of the following information:

first indication information used to indicate pattern of synchronized signal blocks repetition in time-domain transmission resources;

second indication information used to indicate pattern of synchronized signal blocks repetition in frequency-domain transmission resources; and third indication information used to indicate Quasi Co-Location (QCL) information of the synchronized signal blocks.

The pattern indicated by the first indication information includes at least one of the following information: position information of candidate time-domain transmission resources for synchronized signal blocks repetition, position information of time-domain transmission resources actually used for synchronized signal blocks repetition, information of allowed repetition times of synchronized signal blocks in time-domain transmission resources, and information of actual repetition times of synchronized signal blocks in time-domain transmission resources.

The pattern indicated by the second indication information includes at least one of the following information: position information of candidate frequency-domain transmission resources for synchronized signal blocks repetition, position information of frequency-domain transmission resources actually used for synchronized signal blocks repetition, information of allowed repetition times of synchronized signal blocks in frequency-domain transmission resources, information of actual repetition times of synchronized signal blocks in frequency-domain transmission resources, numerology information of candidate frequency-domain transmission resources allowed for synchronized signal blocks repetition, and numerology information of frequency-domain transmission resources actually used for synchronized signal blocks repetition.

The quasi-co-location information indicated by the third indication information includes at least one of the following information: spatial quasi-co-location information of antenna port for synchronized signal blocks transmission, average gain quasi-co-location information of antenna port for synchronized signal blocks transmission, delay quasi-co-location information of antenna port for synchronized signal blocks transmission and Doppler parameter quasi-co-location information of antenna port for synchronized signal blocks transmission.

When the auxiliary measurement information includes the first indication information and the second indication information, the first indication information and the second indication information may be separately indicated, or, the first indication information and the second indication information may also be jointly indicated.

The first indication information and the second indication information form a joint index information. The joint index information is used to indicate a pattern of synchronized signal blocks repetition in time-domain transmission resources and frequency-domain transmission resources.

The first indication information includes at least one of first index information used to indicate a pattern of synchronized signal blocks repetition in time-domain transmission resources, bitmap information (bitmap), group information, information of repetition times and bitmap information of repetitive synchronized signal blocks in each group.

The second indication information includes at least one of second index information used to indicate a pattern of synchronized signal blocks repetition in frequency-domain transmission resources, bitmap information (bitmap), group information, information of repetition times and bitmap information of repetitive synchronized signal blocks in each group.

The auxiliary measurement information may further include at least one of the following information:

fourth indication information used to indicate transmission period of synchronized signal set; and fifth indication information used to indicate actually transmitted synchronized signal block information of the synchronized signal set.

Specifically, the computer program is called by the processor 104 to perform: transmitting to the UE through system information or RRC layer signaling, the auxiliary measurement information which is used to assist the UE to perform synchronized signal block measurement.

The network device may be a Base Transceiver Station (BTS) in Global System of Mobile communication (GSM) or Code Division Multiple Access (CDMA), a NodeB (NB) in Wideband Code Division Multiple Access (WCDMA), an evolved Node B (eNB or eNodeB) in LTE, a relay station, an access point, or a base station in a future 5G network, which is not limited herein.

The network device of the embodiment of the present disclosure transmits to the UE the auxiliary measurement information for assisting the synchronized signal block measurement, and the UE performs synchronized signal block measurement according to the auxiliary measurement information. Since the auxiliary measurement information carries the transmission configuration information indicating transmission configuration of the synchronized signal block, the UE can obtain the transmission configuration of the synchronized signal blocks. This facilitates the UE for quickly detecting the corresponding synchronized signal block, thereby reducing blind detection difficulty, blind detection time and measurement time, improving measurement accuracy, accelerating cell access/reselection/handover, and achieving energy saving in the UE.

Persons having ordinary skill in the art may obtain that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

In addition, it should be pointed out that, in the device and method of the present disclosure, it is obvious that each component, or each block may be subdivided, and/or, recombined. These subdivision, and/or, recombination should be taken as equivalent solution of the present disclosure. Besides, blocks for performing foregoing series of processes may be executed, according to described time sequence. However, time sequential execution is not necessary. Some blocks may be performed in parallel, or may be executed independently. Persons having ordinary skill in the art may understand that all the blocks, or components, any block or component may be implemented in hardware, firmware, software, or a combination thereof, in any computing device (including a processor, storage medium, and so on), or in a network of computing device, which may be implemented by persons having ordinary skill in the art, after reading descriptions of the present disclosure and using their basic programming skills.

Thus, objectives of the present disclosure may be achieved by running one program, or a group of programs in any computing device. The computing device may be a known common device. Thus, the objectives of the present disclosure may also be implemented by a program product, which includes program codes implementing the method or device. That is, such program product may also form the present disclosure. And, a storage medium storing such program product also form the present disclosure. It is obvious that the storage medium may be any known storage medium, or any storage medium to be developed. It should also be pointed out that, in the devices and methods of the present disclosure, it is obvious that each component, or each block may be further subdivided, and/or, may be recombined. These subdivision, and/or, recombination should be taken as the equivalent solution of the present disclosure. Besides, blocks for executing foregoing series of process may be performed, according to described time sequence. But it is not necessary to perform the blocks according to time sequence. Some blocks may be performed in parallel, or may be performed independently.

Foregoing describes optional implementation modes of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A method of synchronized signal block measurement, performed by a user equipment (UE), comprising:

receiving auxiliary measurement information, which is transmitted by a network device; wherein the auxiliary measurement information comprises first indication information, and the first indication information comprises first index information used to determine synchronized signal blocks which are Quasi Co-Located (QCL) in time-domain transmission resources; and determining the quasi-co-located information of the synchronized signal blocks according to the auxiliary measurement information.

2. The method according to claim 1, wherein the auxiliary measurement information further comprises:

second indication information used to indicate pattern of synchronized signal blocks which are QCL in frequency-domain transmission resources.

3. The method according to claim 2, Wherein the second indication information comprises at least one of the following information:

position information of candidate frequency-domain transmission resources for synchronized signal blocks, position information of frequency-domain transmission resources actually used for synchronized signal blocks numerology information of candidate frequency-domain transmission resources for synchronized signal blocks, and numerology information of frequency-domain transmission resources actually used for synchronized signal blocks.

4. The method according to claim 2, wherein when the auxiliary measurement information comprises the first indication information and the second indication information, the first indication information and the second indication information are separately indicated, or, the first indication information and the second indication information are jointly indicated.

5. The method according to claim 4, wherein when the auxiliary measurement information comprises the first indication information and the second indication information, the first indication information and the second indication information are jointly indicated; the first indication information and the second indication information form a joint index information; the joint index information is used to indicate synchronized signal blocks which are QCL in time-domain transmission resources and frequency-domain transmission resources; and/or, wherein the first indication information further comprises at least one of: bitmap information, group information, and bitmap information of synchronized signal blocks which are QCL in each group; and/or, the second indication information comprises at least one of: second index information used to indicate pattern of synchronized signal blocks which are QCL in frequency-domain transmission resources, bitmap information, group information, and bitmap information of synchronized signal blocks which are QCL in each group.

6. The method according to claim 2, wherein the auxiliary measurement information further comprises at least one of the following information:

fourth indication information used to indicate transmission period of a synchronized signal set; and fifth indication information used to indicate actually transmitted synchronized signal block information of the synchronized signal set.

7. The method according to claim 1, wherein the first indication information comprises at least one of the following information:

position information of candidate time-domain transmission resources for synchronized signal blocks, position information of time-domain transmission resources actually used for synchronized signal blocks.

8. The method according to claim 1, wherein the quasi-co-located information comprises at least one of the following information:

spatial quasi-co-located information of antenna port for synchronized signal blocks transmission, average gain quasi-co-located information of antenna port for synchronized signal blocks transmission, delay quasi-co-location information of antenna port for synchronized signal blocks transmission and Doppler parameter quasi-co-located information of antenna port for synchronized signal blocks transmission.

9. The method according to claim 1, wherein the step of receiving auxiliary measurement information, which is transmitted by a network device, comprises:

receiving through system information or RRC layer signaling, the auxiliary measurement information which is transmitted by the network device.

10. User equipment (UE) comprising: a processor, a memory, and a computer program stored on the memory and executable on the processor; wherein the computer program is executed by the processor to implement steps of a method of synchronized signal block measurement which comprising:

receiving auxiliary measurement information, which is transmitted by a network device; wherein the auxiliary measurement information comprises first indication information, and the first indication information comprises first index information used to determine synchronized signal blocks which are Quasi Co-Located (QCL) in time-domain transmission resources; and determining the quasi-co-located information of the synchronized signal blocks-according to the auxiliary measurement information.

11. The user equipment according to claim 10, wherein the auxiliary measurement information further comprises:

second indication information used to indicate pattern of synchronized signal Mocks Which are QCL in frequency-domain transmission resources.

12. A method of synchronized signal block measurement, performed by a network device, comprising:

transmitting to one or more user equipments (UEs), auxiliary measurement information; wherein the auxiliary measurement information comprises first indication information, and the first indication information comprises first index information used to determine synchronized signal blocks which are Quasi Co-Located (QCL) in time-domain transmission resources.

13. The method according to claim 12, wherein the auxiliary measurement information further comprises:

second indication information used to indicate pattern of synchronized signal blocks which are QCL in frequency-domain transmission resources.

14. The method according to claim 13, wherein the pattern indicated by the second indication information comprises at least one of the following information:

position information of candidate frequency-domain transmission resources for synchronized signal blocks repetition, position information of frequency-domain transmission resources actually used for synchronized signal blocks repetition, information of allowed repetition times of synchronized signal blocks in frequency-domain transmission resources, information of actual repetition times of synchronized signal blocks in frequency-domain transmission resources, numerology information of candidate frequency-domain transmission resources allowed for synchronized signal blocks repetition, and numerology information of frequency-domain transmission resources actually used for synchronized signal blocks repetition.

15. The method according to claim 13, wherein when the auxiliary measurement information comprises the first indication information and the second indication information, the first indication information and the second indication information are separately indicated.

16. The method according to claim 13, wherein when the auxiliary measurement information comprises the first indication information and the second indication information, the first indication information and the second indication information are jointly indicated; the first indication information and the second indication information form a joint index information; the joint index information is used to indicate synchronized signal blocks which are QCL in time-domain transmission resources and frequency-domain transmission resources; or,
  wherein the first indication information comprises at least one of bitmap information, group information, and bitmap information of synchronized signal blocks which are QCL in each group; and, the second indication information comprises at least one of second index information used to indicate pattern of synchronized signal blocks which are QCL in frequency-domain transmission resources, bitmap information, group information, and bitmap information of synchronized signal blocks which are QCL in each group.

17. The method according to claim 12, wherein the first indication information comprises at least one of the following information:
  position information of candidate time-domain transmission resources for synchronized signal blocks, position information of time-domain transmission resources actually used for synchronized signal blocks.

18. The method according to claim 12, wherein the information comprises at least one of the following information:
  spatial quasi-co-located information of antenna port for synchronized signal blocks transmission, average gain quasi-co-located information of antenna port for synchronized signal blocks transmission, delay quasi-co-location information of antenna port for synchronized signal blocks transmission and Doppler parameter quasi-co-located information of antenna port for synchronized signal blocks transmission.

19. The method according to claim 12, wherein the step of transmitting to one or more user equipments (UEs), auxiliary measurement information, comprises:
  transmitting through system information or RRC layer signaling, the auxiliary measurement information.

20. A network device comprising: a processor, a memory, and a computer program stored on the memory and executable on the processor; wherein the computer program is executed by the processor to implement steps of the method according to claim 12.

* * * * *